United States Patent
Pincus et al.

(10) Patent No.: US 10,098,326 B2
(45) Date of Patent: Oct. 16, 2018

(54) MULTI-PIECE ANIMAL COLLAR

(71) Applicants: Julie Pincus, New York, NY (US); Cary Stefani, Orchard Lake, MI (US)

(72) Inventors: Julie Pincus, New York, NY (US); Cary Stefani, Orchard Lake, MI (US)

(*) Notice: Subject to any disclaimer, the term of this patent is extended or adjusted under 35 U.S.C. 154(b) by 524 days.

(21) Appl. No.: 14/580,921

(22) Filed: Dec. 23, 2014

(65) Prior Publication Data
US 2015/0173328 A1 Jun. 25, 2015

Related U.S. Application Data

(60) Provisional application No. 61/920,132, filed on Dec. 23, 2013.

(51) Int. Cl.
*A01K 27/00* (2006.01)

(52) U.S. Cl.
CPC ....... *A01K 27/001* (2013.01); *Y10T 29/49838* (2015.01)

(58) Field of Classification Search
CPC .................................................. A01K 27/001
USPC ...................................................... 119/792
See application file for complete search history.

(56) References Cited

U.S. PATENT DOCUMENTS

| | | | | |
|---|---|---|---|---|
| 71,116 A * | 11/1867 | Andrews | ........... | A44B 11/22 24/176 |
| 322,087 A * | 7/1885 | Bassinger | ........... | A44B 11/22 24/176 |
| 540,261 A * | 6/1895 | Law | ........... | B68B 5/08 24/176 |
| 555,000 A * | 2/1896 | George | ........... | A44B 11/22 24/176 |
| 805,336 A * | 11/1905 | Bennett | ........... | A44B 11/22 24/176 |
| 1,747,401 A * | 2/1930 | Stickling | ........... | A44B 11/04 24/186 |
| 3,641,984 A | 2/1972 | Lanus | | |
| 4,174,553 A | 11/1979 | Schrougham et al. | | |
| 4,309,797 A | 1/1982 | Schrougham et al. | | |
| 4,399,568 A | 8/1983 | Pfleger | | |
| 5,664,844 A * | 9/1997 | Greene | ........... | A47D 15/006 119/770 |
| 5,701,849 A | 12/1997 | Suchowski et al. | | |
| 5,806,468 A | 9/1998 | Ryder | | |
| 5,911,199 A * | 6/1999 | Farkas | ........... | A01K 27/009 119/712 |
| 6,880,490 B2 | 4/2005 | Hanna | | |
| 7,617,801 B2 | 11/2009 | Wang | | |
| 8,434,429 B2 | 5/2013 | Moeller | | |
| 2007/0034165 A1 | 2/2007 | Yang | | |
| 2009/0044764 A1 | 2/2009 | Wang | | |
| 2010/0031897 A1* | 2/2010 | Moeller | ........... | A01K 27/005 119/792 |

(Continued)

*Primary Examiner* — Son T Nguyen
(74) *Attorney, Agent, or Firm* — Carlson, Gaskey & Olds, P.C.

(57) ABSTRACT

An example collar includes a strap, a removable buckle slidable along the strap, and at least one removable leash attachment. The leash attachment includes a strap-receiving portion with a thickness approximately equal to a thickness of the strap such that the strap is receivable in the strap-receiving portion in a biased fit and the leash attachment is fixable at a location along the strap. Another example collar and a method of assembling a collar are also disclosed.

20 Claims, 6 Drawing Sheets

(56) References Cited

U.S. PATENT DOCUMENTS

| | | |
|---|---|---|
| 2010/0282183 A1 | 11/2010 | Lennox |
| 2011/0107562 A1 | 5/2011 | Spielberger |
| 2011/0154955 A1* | 6/2011 | Fidrych ................ A01K 27/006 81/3.09 |
| 2013/0269628 A1 | 10/2013 | Holt, Jr. |

* cited by examiner

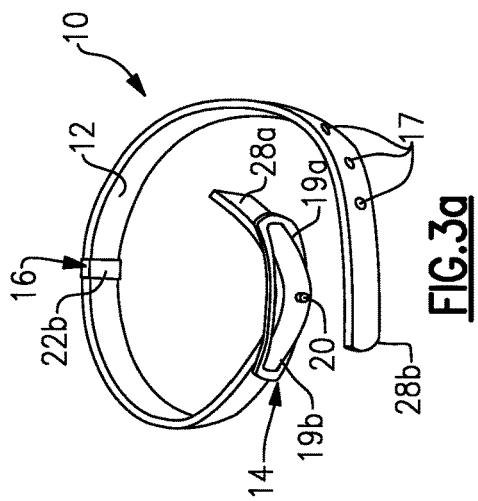
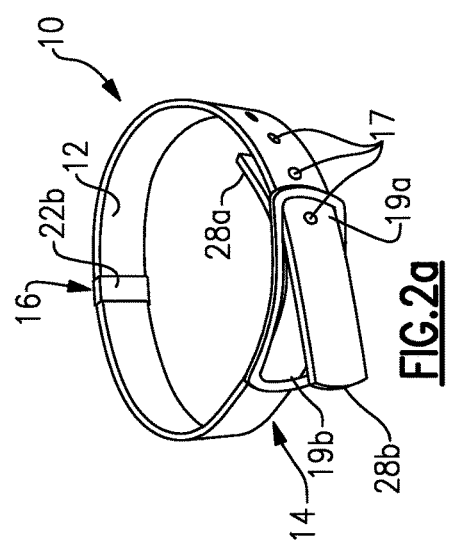
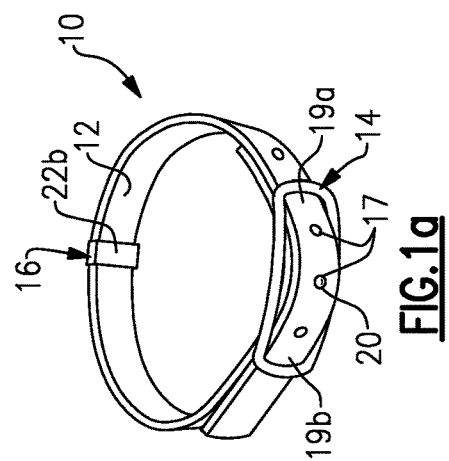
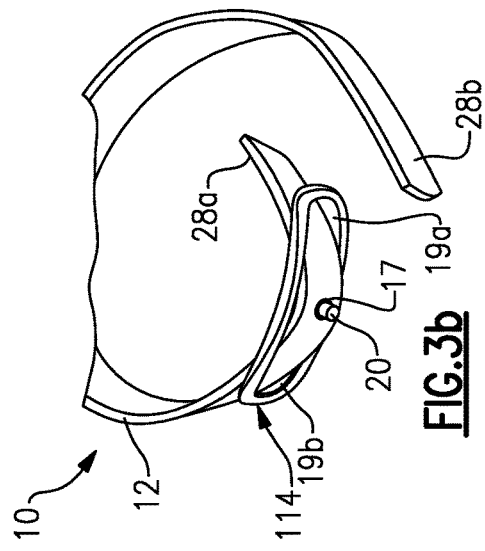
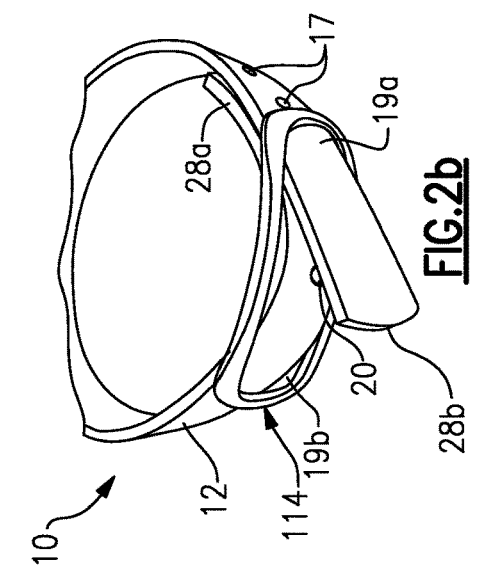
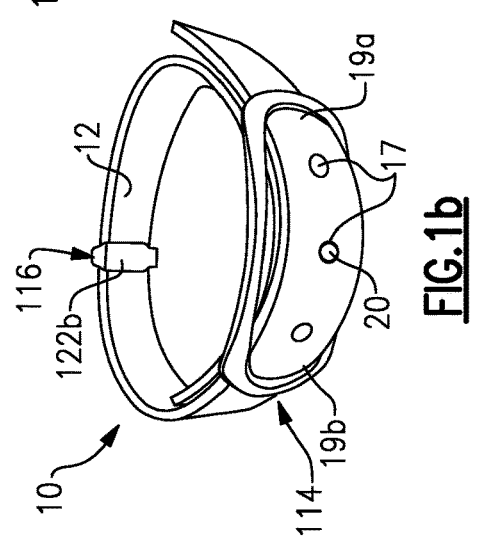

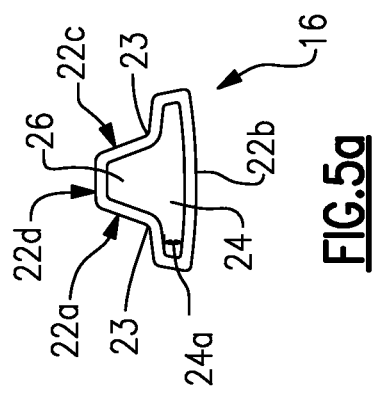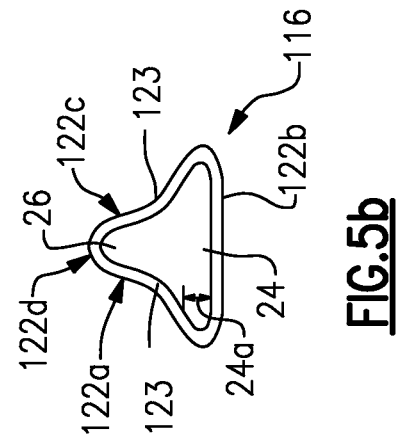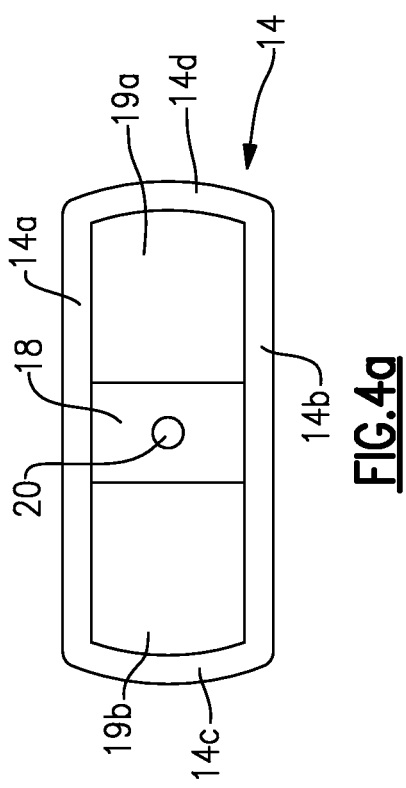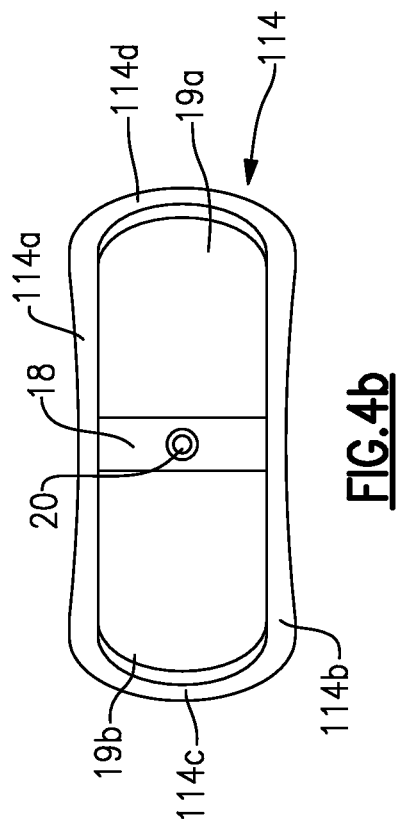

MULTI-PIECE ANIMAL COLLAR

CROSS-REFERENCE TO RELATED APPLICATIONS

This application claims priority to U.S. Provisional Application No. 61/920,132 filed Dec. 23, 2013.

BACKGROUND

This disclosure relates to a multi-piece animal collar. Animal collars, such as dog collars, may include multiple attached parts that cannot be independently assembled or removed, such as a leash attachment and a buckle attached to a strap by stitching or sewing. The stitching may make it difficult or impossible to interchange the parts and strap in order to change the style or size of the collar. Additionally, as one or more of the parts age or wear, it may be necessary to replace the entire collar instead of just the aged or worn part. The leash attachment may be attached to the strap in such a way that it is free to pivot with respect to the strap. When the leash attachment is not upright, it may be difficult to attach the leash. The leash attachment may also move around the strap unnecessarily, and if attached to the leash, in a way that may discomfort the animal. Moreover, components or pieces of a collar are typically assembled in a way such that the piece is no longer independently removable or able to be independently assembled.

SUMMARY

An example collar includes a strap, a removable buckle slidable along the strap, and at least one removable leash attachment The leash attachment includes a strap-receiving portion with a thickness approximately equal to a thickness of the strap such that the strap is receivable in the strap-receiving portion in a biased fit and the leash attachment is fixable at a location along the strap.

Another example collar includes a strap, a buckle slidable along the strap, the rectangular buckle including a central divider dividing the strap into a first side and a second side, the first side and the second side receiving a first end and a second end of the strap in an overlapping manner, and a peg on the central divider configured to be received in one or more holes in the strap, and at least one leash attachment having a generally triangular portion, the leash attachment including a first side, a second side shorter than the first side, a third side, and a fourth side arranged between and angled with respect to the first side and the second side, the third side and the fourth side each including crimps extending towards one another and forming a strap-receiving portion between the crimps and the first side. The strap-receiving portion receives the strap in a biased fit such that the leash attachment is configured to be fixed at a location along the strap. The strap, the buckle, and the at least one leash attachment are independently removable relative to each other.

An example method of assembling a collar includes providing a strap, sliding a leash attachment that is independent of the strap onto the strap, the leash attachment including a first side, a second side shorter than the first side, a third side, and a fourth side arranged between and angled with respect to the first side and the second side, the third side and the fourth side each including crimps extending towards one another and providing a bias fit such that the leash attachment is fixed at a location along the strap, and installing a buckle that is independent of the strap and the leash attachment on to the strap.

BRIEF DESCRIPTION OF THE DRAWINGS

FIG. 1a shows a three-piece no-sew dog collar assembled and in a closed position.

FIG. 2a shows a perspective view of the collar of FIG. 1a in a partially open position.

FIG. 3a shows the collar of FIG. 1a in a fully open position.

FIG. 4a shows a buckle of the collar of FIG. 1a.

FIG. 5a shows a leash attachment of the collar of FIG. 1a.

FIG. 1b shows another three-piece no-sew dog collar assembled and in a closed position.

FIG. 2b shows a perspective view of the collar of FIG. 1b in a partially open position.

FIG. 3b shows the collar of FIG. 1b in a fully open position.

FIG. 4b shows a buckle of the collar of FIG. 1b.

FIG. 5b shows a leash attachment of the collar of FIG. 1b.

FIG. 8 shows a leash attachment of the collar of FIG. 1a.

DETAILED DESCRIPTION

Figure 6A:
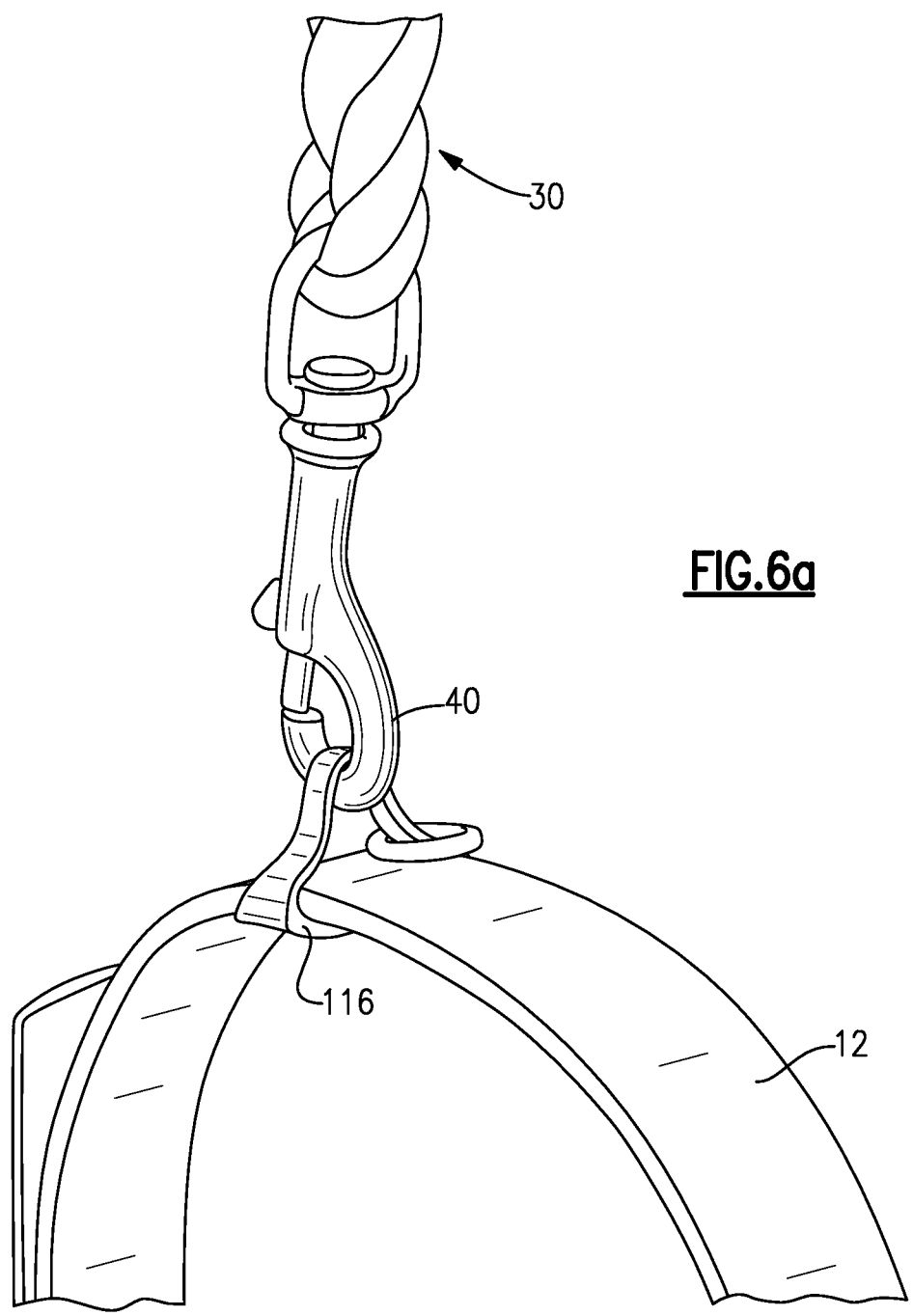
FIG. 6a shows an example collar attached to a leash.

FIGS. 1a-3a show an example animal collar 10. The collar 10 includes a strap 12, a buckle 14, and a leash attachment 16. In this example, the collar 10 is a dog collar. However, collars for use on other animals are contemplated. In this example, the collar 10 is a three piece collar; however, additional pieces may be used. Each of the strap 12, the buckle 14, and the leash attachment 16 are independently removable and independently assembled such that any component of the collar 10 may be independently and individually replaced.

In this example, the buckle 14 has a generally rectangular profile and the leash attachment has a generally triangular profile, as will be described in further detail below. The buckle 14 and leash attachment 16 are slidable along the strap 12 and are not attached to the strap 12 by any stitching. Because there is no stitching, the strap 12, buckle 14, and leash attachment 16 are interchangeable to modify the size or style of the collar 10, or replace worn or broken components without replacement of the entire collar 10.

The strap 12 includes first and second ends 28a, 28b. Each of the first and second ends 28a, 28b includes one or more holes 17. The holes 17 allow for adjusting the size of the collar 10 and attaching the strap 12 to the buckle 14, as will be discussed below. In one example, the strap 12 is leather, which is used for its stiffness and resistance to wear. However, in another example it may be made from a different material or combination of materials.

The buckle 14 has a curved profile such that when assembled, the strap 12 passes through the buckle 14 and the collar 10 is generally circular. As is shown in FIG. 4a, the buckle 14 has a generally rectangular profile. The buckle 14 has a set of first and second opposed long sides 14a, 14b and a set of first and second opposed short sides 14c, 14d. In this example, the second opposed short sides 14c, 14d are non-linear. The buckle 14 includes a center divider 18 that divides the buckle 14 into first and second sides 19a, 19b. In the example of FIG. 4a, the set of first and second opposed short sides 14c, 14d are curved outward with respect to the peg 20 and the set of first and second long sides 14a, 14b are straight. However, in another example, the four sides 14a, 14b, 14c, 14d may be any combination of linear or non-linear sides. The center divider 18 includes a peg 20. The peg 20 is sized to be receivable in the holes 17 of the strap 12. In one example, the center divider 18 is located at the midpoint of the set of first and second opposed long sides 14a, 14b and is generally perpendicular to the first and second opposed long sides 14a, 14b; however, in another example, it may be located anywhere along the set of first and second opposed long sides 14a, 14b. In one example, the center divider 18 is angled relative to the first and second opposed long sides 14a, 14b.

As is show in FIG. 5a, the leash attachment 16 has a generally triangular profile and includes a first side 22a, a second side 22b, a third side 22c, and a fourth side 22d. First side 22a and third side 22c extend between second side 22b and fourth side 22d. The first side 22a and third side 22c are crimped inwards. The second side 22b and fourth side 22d are generally linear. The first side 22a and third side 22c are angled relative to the second side 22b. Crimps 23 in the first side 22a and third side 22c separate the leash attachment 16 into a strap receiving portion 24 with a large diameter adjacent to the linear second side 22b, and a leash receiving portion 26 with a smaller diameter adjacent to the linear fourth side 22d. A perimeter of the strap-receiving portion 24 is at least partially defined by the crimps 23 and the first side 22a, and a perimeter of the leash-receiving portion 26 is defined at least partially by the crimps 23 and the second side 22b. In the example of FIG. 5a, crimps 23 are squared off to form a step parallel to the linear second side 22b. In this example, each corner of the triangular leash attachment 16 is squared.

Figure 6B:
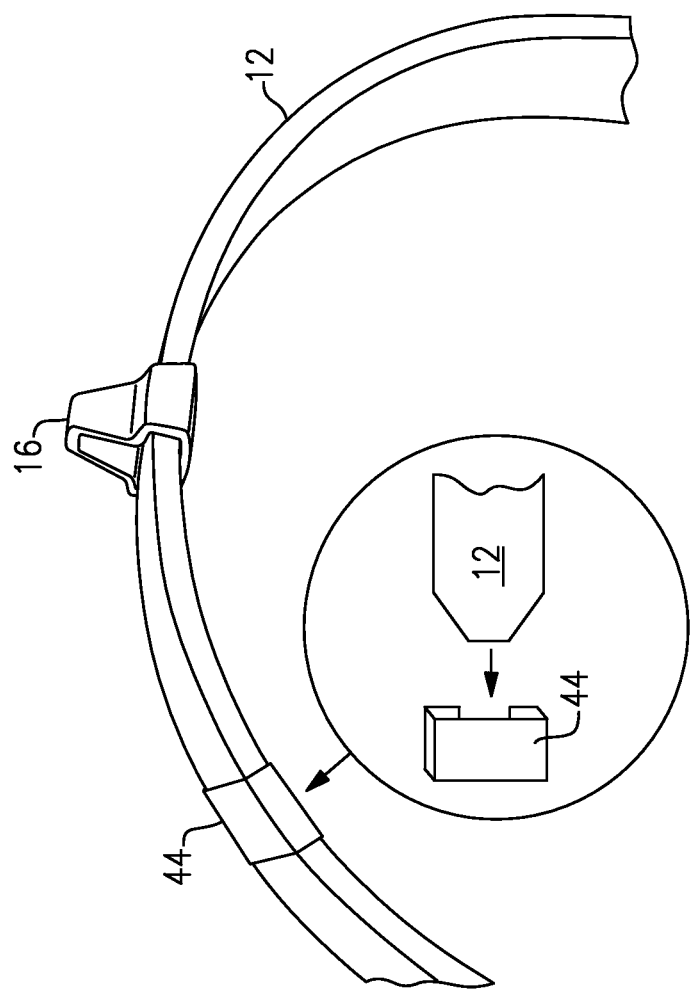
FIG. 6b shows an example collar including an independently attached sleeve

The strap 12 is received in the strap receiving portion 24. The strap receiving portion 24 is sized to receive leash attachment 16 with a biased fit such that once placed on strap 12, leash attachment 16 is maintained in position and orientation unless the bias is overcome. That is, the strap receiving portion 24 has a fit such that leash attachment 16 moves with the strap 12 and does not move along strap 12 as a result of movement of the strap 12 unless an additional force is applied. The leash attachment 16 can slide along the strap 12 by overcoming a bias caused by the fit between the strap 12 and the strap receiving portion 24. In one example, the crimped sides 22a, 22c provide the bias fit for the strap 12 in the strap receiving portion 24 such that force is necessary to slide the leash attachment 16 along the strap 12. The crimped sides 22a, 22c also prevent the leash attachment 16 from pivoting about the strap 12. This ensures that the leash receiving portion 26 is always upright and extending away from the strap 12, so that a leash 30 (as shown in FIGS. 6a-6c) can be easily attached via clip 40.

Figure 6C:
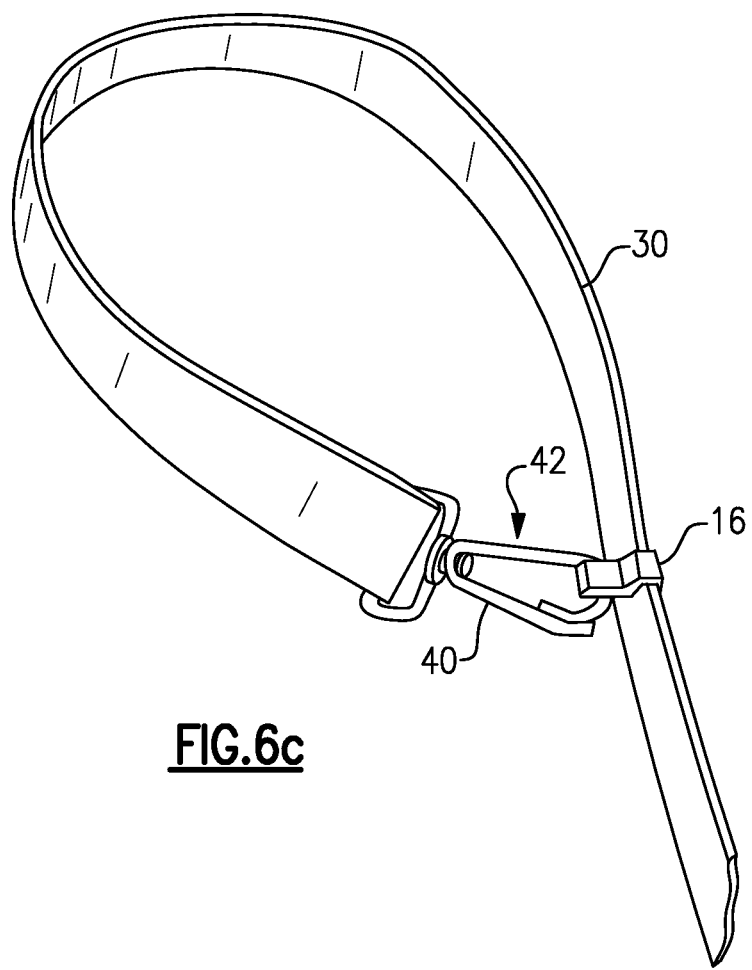
FIG. 6c shows an example leash having an end attached to a second leash attachment disposed on the leash.

As shown in FIG. 6c, in one example, the leash 30 may include additional leash attachments 16 along its length to allow a user to form adjustable loops in the leash 30 for various needs. In this example the leash 30 is of a similar material to the strap 12 such that the leash attachment is maintained in position and orientation by biasing, as described herein. In one example, the end 42 of the leash 30 includes a clip 40 to attach to the additional leash attachments 16 on the leash 30. In one example, the loop is sized based upon a pre-determined distance the animal is allowed to be from the user. In another example, the loop is sized to fit around any of an arm, a wrist, or the waist of a user. In another example, the loop is sized to be placed over the user's shoulder.

FIGS. 1b-3b show another example collar 10 including a strap 12, a buckle 114, and a leash attachment 116. The collar 10 as shown in FIGS. 1b-3b includes all of the features of the collar 10 of FIGS. 1a-3a, except as indicated below.

FIG. 4b shows the example buckle 114 of the collar 10 of FIGS. 1b-3b. The buckle 114 has a set of first and second opposed long sides 114a, 114b and a set of first and second opposed short sides 114c, 114d. In the example of FIG. 4b, the set of first and second opposed long sides 114a, 114b are curved inwards with respect to a peg 20 while the set of first and second opposed short sides 114c, 114d are curved outwards with respect to the peg 20. The buckle 114 may be used in combination in any collar 10 including any strap 12 and leash attachment 16 described herein.

FIG. 5b shows an example leash attachment 116 of the collar 10 of FIGS. 1b-3b. Leash attachment 116 has a first side 122a, a second side 122b, and a third side 122c. The first side 122a and third side 122c are crimped inward at crimps 123. A perimeter of the strap-receiving portion 24 is at least partially defined by the crimps 123 and the first side 122a, and a perimeter of the leash-receiving portion 26 is defined at least partially by the crimps 123 and the second side 122b. The crimps 123 are rounded. The corners of the leash attachment 116 are rounded. In another example, the crimps 23, 123 and the corners of the leash attachment 16, 116 may be rounded, squared off, or a combination of the two.

Interaction of the example buckle 114 and example leash attachment 116 with strap 12 of collar 10, and the features of the collar 10 are otherwise the same as described above with regard to the collar 10 disclosed in FIGS. 1a-5a.

Any of the features of leash attachment 16 and leash attachment 116 described herein may be combined to form a leash attachment. Leash attachment 16, leash attachment 116, and any combination thereof, may be used together with any strap 12, buckle 14, and leash 30 described herein to form collar 10 and leash 30.

In one example, the buckle 14, 114 and leash attachment 16, 116 are metallic, however, in another example, the buckle 14, 114 and leash attachment 16, 116 may be made from another material or combination of materials.

Referring to FIGS. 1a-5a, 2b-5b, and 8, in one example, the collar 10 has a strap 12 with width between about 1.21875 inches and 0.5 inches. In one example, the width is about 0.9375 inches. In one example, the strap 12 has a length between about 33 inches and about 10 inches. In one example, the collar has a length of about 22.5 inches. In one example, the strap 12 has a thickness between about 0.1875 inches and 0.078125 inches. In one example, the strap 12 has a thickness of about 0.125 inches. In one example, the strap receiving portion 24 has a thickness 24a approximately equal to the thickness of the strap.

In one example, the buckle 14, 114 has a length between about 4.25 inches and 1.75 inches along the first long side 14a, 14b, 114a, 114b. In one example, the buckle 14, 114 has a length of about 3.125 inches along the first long side 14a, 14b, 114a, 114b. In one example, the buckle 14, 114 has a width between about 2.6875 inches and 0.75 inches along the first short side 14c, 14d, 114c, 114d. In one example, the buckle 14, 114 has a width of about 1.375 inches along the first short side 14c, 14d, 114c, 114d.

Figure 8:
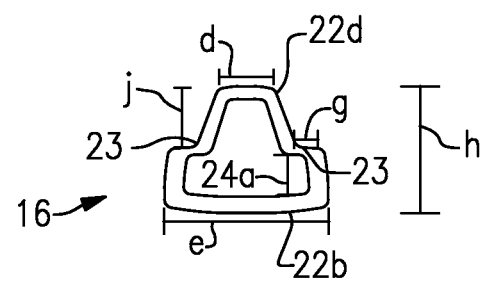

As is shown in FIG. 8, the leash attachment 16, 116 has a side 22d with a length d between about 0.25 inches and 0.5 inches in length. In one example, the leash attachment has a side 22*d* of about 0.375 inches. The leash attachment 16, 116 has a side 22*b* with a length e between about 0.75 inches and 1.5 inches in length. In one example, the leash attachment has a side 22*b* of about 1.125 inches. The leash attachment 16, 116 has a height h between about 0.5625 inches and 0.875 inches in length. In one example, the leash attachment has a height h of about 0.625 inches. The leash attachment 16, 116 has a length j between the crimp 23, 123 and the side 22*d* between about 0.3125 inches and 0.625 inches. In one example, the leash attachment has a length j of about 0.5 inches. In one example, the thickness 24*a* of the strap receiving portion 24 is approximately equal to the thickness of the strap 12. The crimps 23, 123 extend a length g between about 0.3125 inches and 0.125 inches inwards from the sides of the leash attachment 16, 116, respectively. In one example, the crimps 23, 123 extend about 0.25 inwards from the sides of the leash attachment 16, 116. Although shown in FIG. 8 as leash attachment 16, each of the above dimensions are equally applicable to leash attachment 116 and provide the independently removable and substitutable components of the collar, while allowing providing a safer and sturdier collar compared to previous collars, including those attaching components with stitching.

Figure 7:
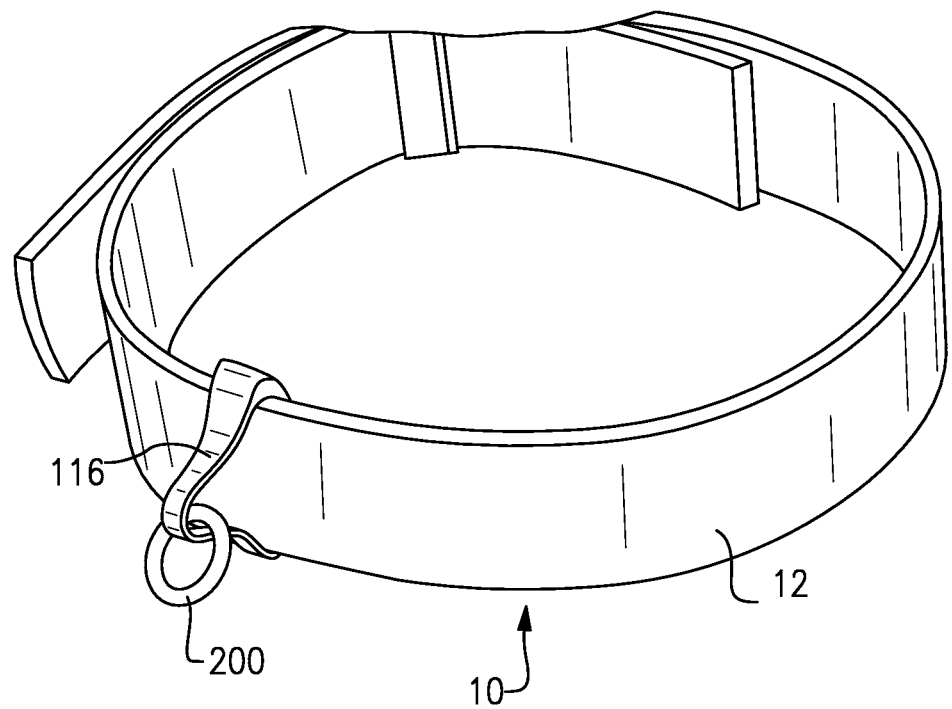
FIG. 7 shows an example collar including a leash attachment with an example utility ring.

Referring to FIG. 7, in one example collar 10 includes a leash attachment 116 having a utility ring 200 attached thereto. Utility ring 200 is permanently attached to leash attachment 116. Although shown in this example as leash attachment 116, utility ring 200 may be used with any leash attachment of this disclosure. When leash attachment 116 is positioned on strap 12, utility ring 200 is disposed between leash attachment 116 and strap 12 such that it will remain attached to leash attachment 116. In one example, a name tag, address tag, license tag, or other item is attached to utility ring 200. Use of utility ring prevent additional items, such as the name tag, from tearing or wearing on other portions of strap 12 and buckle 14, 114. Moreover, use of utility ring 200 allows for efficient and quick removal of any additional items, such as name tags, as well as swapping of different items or tags.

To assemble the collar 10, the leash attachment 16 is installed onto the strap 12 by inserting the strap 12 into the strap receiving portion 24 of the leash attachment 16. The leash attachment 16 is positioned in a desired location along the strap 12, for example, in the center of the strap 12. Once in position, the leash attachment 16 maintains its position and orientation unless force is applied to overcome the bias between the leash attachment 16 and strap 12. In one example, a sleeve 44 (shown in FIG. 6*b*) can be installed over the strap before or after installing the leash attachment 16. The sleeve can be of a different or the same material as the strap 12 and can be used to change the appearance of the strap 12.

In one example, the sleeve 44 includes animal identifying information, such as name, home address, and phone number of the owner. Sleeve 44 is also independently removable and interchangeable with other sleeves 44. In this example, sleeve 44 covers a portion of strap 12. However, a sleeve covering substantially the entire strap 12 is contemplated.

As is shown in FIGS. 1*a*-3*a*, the first end 28*a* of the strap 12 is then inserted up through the second side 19*b* of the buckle 14, over the center divider 18, and down into the first side 19*a* of the buckle 14. A hole 17 in the first end 28*a* of the strap 12 receives the peg 20. As is shown in FIG. 2, the second end 28*b* of the strap 12 is inserted up through the first side 19*a* of the buckle 14, overlapping the first end 28*a* of the strap, and down through the second side 19*b* of the buckle 14. A hole 17 on the second end 28*b* of the strap 12 also receives the peg 20. As is shown in FIG. 1, the second end 28*b* of the collar is then inserted down into the second side 19*b* of the buckle 14. During assembly, the size of the collar 10 can be varied by varying the amount of overlap between the first and second ends 28*a*, 28*b* of the strap 12 and aligning the appropriate holes 17 to receive the peg 20.

The collar 10 can be disassembled by removing the second end 28*b* of the strap 12 from the second side 19*b* of the buckle 14 and removing the peg 20 from the hole 17. The second end 28*b* of the strap 12 can then be removed from the first side 19*a* of the buckle 14. The first end 28*a* of the strap 12 can then be removed from the first side 19*a* of the buckle 14, the peg 20 removed from the hole 17, and the first end 28*a* of the strap 12 removed from the second side 19*b* of the buckle 14. The buckle 14 can be changed by replacing it with another, second buckle, such as the buckle 114 and assembled as described above. Alternatively, the leash attachment 16 can be slid off of the strap 12 and replaced with another leash attachment, such as the alternate leash attachment 116 before reassembly. Moreover, use of leash attachment 16, 116 provides a safer dog collar as it is less likely to wear on the strap 12. In prior examples, if the strap that is stitched to attach leash attachment tore, leash attachment would not be re-attachable and the animal would be loose. This would happen often as leash attachments of previous examples would wear on the strap during use. The present disclosure surrounds the strap 12, is cast metal, and has less relative movement between strap 12 and leash attachment 16, 116.

As shown in FIGS. 1*b*-5*b*, the same assembly, replacement, and disassembly steps can also be performed with the buckle 114 or the leash attachment 116. In this manner, a multi piece collar 10 is provided with pieces independently assembled, replaced, and disassembled to allow replacement of worn parts and interchanging of various collar 10 components.

Although various features of the collar, strap, buckle, leash attachment, leash, and sleeve are disclosed, it is understood that any feature of any example of these components described herein may be combined, or used in any combination, with any other example described herein.

Although preferred embodiments of this disclosure have been disclosed, a worker of ordinary skill in this art would recognize that certain modifications would come within the scope of this disclosure. For that reason, the following claims should be studied to determine the true scope and content of this disclosure.

What is claimed is:

1. A collar, comprising:
   a strap;
   a removable buckle slidable along the strap; and
   at least one removable leash attachment, the leash attachment including a strap-receiving portion with a thickness approximately equal to a thickness of the strap such that the strap is receivable in the strap-receiving portion in a biased fit and the leash attachment is fixable at a location along the strap; wherein the at least one removable leash attachment is generally triangular and includes a first side, a second side, a third side, and a fourth side, wherein the fourth side is shorter than the second side, and wherein the first side and the third side each extend between and are angled with respect to the second side and the fourth side, and the first side and the third side each include a crimp and the crimps extend toward one another, and wherein a perimeter of the strap-receiving portion is at least partially defined by the crimps and the first side, and a perimeter of the leash-receiving portion is defined at least partially by the crimps and the second side.

2. The collar of claim 1, wherein the buckle is generally rectangular.

3. The collar of claim 1, wherein the buckle includes a center divider that divides the buckle into a first side and a second side, and a peg on the center divider configured to be received in at least one hole in the strap.

4. The collar of claim 3, wherein the first side and the second side of the buckle receive the first side and the second side of the strap, respectively, in an overlapping fashion over the center divider.

5. The collar of claim 1, wherein the strap-receiving portion is between the crimps and the first side, and a leash-receiving portion is between the crimps and the second side.

6. The collar of claim 1, wherein the first side of the at least one removable leash attachment has a length between about 0.75 and 1.5 inches, the second side of the leash attachment has a length between about 0.25 inches and 0.5 inches, and a distance between the first side and the second side is between about 0.56 inches and 0.88 inches.

7. The collar of claim 1, wherein the crimps are located about 0.31 and 0.63 inches from the second side and extend between about 0.31 and 0.13 inches towards one another.

8. The collar of claim 1, wherein the at least one removable leash attachment is held upright relative to a plane of the strap by the biased fit such that the leash-receiving portion extends away from the strap.

9. The collar of claim 1, wherein the location is a midpoint between a first and a second end of the strap.

10. The collar of claim 1, further comprising a utility ring attached to the at least one removable leash attachment, wherein at least one of a name tag, an address tag, and a license tag is connected to the utility ring.

11. The collar of claim 1, wherein the strap has a width between about 1.22 inches and 0.5 inches, a length between about 33 inches and 10 inches, and the thickness of the strap is between about 0.19 inches and 0.08 inches.

12. The collar of claim 1, wherein the crimps provide the bias fit.

13. A collar, comprising:
a strap;
a buckle slidable along the strap, the buckle including a central divider dividing the strap into a first side and a second side, the side and the second side receiving a first end and a second end of the strap in an overlapping manner, and a peg on the central divider configured to be received in one or more holes in the strap; and
at least one leash attachment having a generally triangular portion, the at least one leash attachment including a first side, a second side shorter than the first side, a third side, and a fourth side arranged between and angled with respect to the first side and the second side, the third side and the fourth side each including crimps extending towards one another and forming a strap-receiving portion between the crimps and the first side, and the strap-receiving portion receives the strap in a biased fit such that the at least one leash attachment is configured to be fixed at a location along the strap, wherein the strap, the buckle, and the at least one leash attachment are independently removable relative to each other, and wherein a perimeter of the strap-receiving portion is at least partially defined by the crimps and the first side, and a perimeter of a leash-receiving portion is defined at least partially by the crimps and the second side.

14. The collar of claim 13, wherein the buckle includes a first set of opposed sides and a second set of opposed sides, at least one of the first set of opposed sides and the second set of opposed sides being curved towards an interior of the buckle.

15. The collar of claim 13, wherein the crimps are squared off.

16. A method of assembling a collar, comprising:
providing a strap;
sliding a leash attachment that is independent of the strap onto the strap, the leash attachment including a first side, a second side, a third side, and a fourth side, wherein the first side and the third side each extend between and are angled with respect to the second side and the fourth side, and the first side and the third side each including crimps extending towards one another and providing a bias fit such that the leash attachment is fixed at a location along the strap, wherein a perimeter of a strap-receiving portion of the leash attachment is at least partially defined by the crimps and the first side, and a perimeter of a leash-receiving portion of the leash attachment is defined at least partially by the crimps and the second side; and
installing a buckle that is independent of the strap and the leash attachment on to the strap.

17. The method of claim 16, wherein the installing step includes:
sliding a first end of the strap into a first side of the buckle, over a central divider of a buckle, and into a second side of the buckle;
inserting a peg on the central divider into a first hole in the first end of the strap;
sliding a second end of the strap into the second side of the buckle, over the central divider and first end of the strap, and into the second side of the buckle; and
inserting the peg into a second hole in the second end of the strap to form a circle.

18. The method of claim 16, wherein the buckle is a first buckle, and further comprising removing the first buckle from the strap and installing a second buckle onto the strap.

19. The method of claim 16, wherein the leash attachment is a first leash attachment, and further comprising removing the first leash attachment from the strap and sliding a second leash attachment on to the strap.

20. The method of claim 16, wherein the buckle has a curved profile such that the collar is generally circular after the installing step.

* * * * *